US010060565B2

(12) United States Patent
Bishop, Jr.

(10) Patent No.: US 10,060,565 B2
(45) Date of Patent: Aug. 28, 2018

(54) FLUID TRANSFER COUPLING (71) Applicant: HAMILTON SUNSTRAND CORPORATION, Charlotte, NC (US)

(72) Inventor: Benjamin Elmer Bishop, Jr., South Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 565 days.

(21) Appl. No.: 14/231,089

(22) Filed: Mar. 31, 2014

(65) Prior Publication Data

US 2015/0276114 A1 Oct. 1, 2015

(51) Int. Cl.
F16L 11/12 (2006.01)
F16L 55/00 (2006.01)
F17C 1/00 (2006.01)
B60K 1/00 (2006.01)
B60K 15/04 (2006.01)

(52) U.S. Cl.
CPC .............. F16L 55/00 (2013.01); B60K 1/00 (2013.01); B60K 15/04 (2013.01); F17C 1/00 (2013.01); B60K 2015/048 (2013.01); B60K 2015/0467 (2013.01); F16L 2201/20 (2013.01); F16L 2201/40 (2013.01); Y02E 60/321 (2013.01)

(58) Field of Classification Search
CPC ... F16L 55/00; F16L 2201/40; F16L 2201/20; F17C 1/00; Y02E 60/521; Y02E 60/321
USPC ......................................................... 285/45
See application file for complete search history.

(56) References Cited

U.S. PATENT DOCUMENTS

| 3,620,283 A * | 11/1971 | Brown ..................... B01D 1/22 159/13.2 |
| 3,667,781 A * | 6/1972 | Holbrook ................ F16L 31/00 285/148.19 |
| 4,338,933 A * | 7/1982 | Bayard .................. A61M 39/14 251/149.1 |
| 5,073,753 A * | 12/1991 | Collings .............. G01N 27/626 324/464 |
| 5,379,810 A * | 1/1995 | Marino ................... F16L 55/00 137/312 |
| 6,419,291 B1 * | 7/2002 | Preta ................ A61B 17/22031 294/119.3 |
| 2004/0208756 A1 * | 10/2004 | Adahan ............... A61M 1/0019 417/360 |
| 2005/0017505 A1 * | 1/2005 | Thilly ................... A61M 39/18 285/45 |

(Continued)

Primary Examiner — Basil Katcheves
Assistant Examiner — Joshua Ihezie
(74) Attorney, Agent, or Firm — Cantor Colburn LLP (57) ABSTRACT A fluid transfer coupling is described that includes first and second connectable coupling members that together contain a sealed interior space when connected. A gas or steam purge inlet and a purge outlet are disposed in fluid communication with the sealed interior space for purging potential contaminants out of the interior space. The coupling also includes a vacuum port in fluid communication with the sealed interior space for drawing a vacuum on the sealed interior space and optionally testing the space for an adequate seal. The first coupling member includes a first fluid transfer conduit and the second coupling member includes a second fluid transfer conduit. The first and second fluid transfer conduits are positioned such that they can be connected together within the sealed interior space when the first and second coupling members are connected.

13 Claims, 6 Drawing Sheets (56) References Cited

U.S. PATENT DOCUMENTS

| | | | |
|---|---|---|---|
| 2005/0074660 A1* | 4/2005 | Linder | F16K 31/0627 |
| | | | 429/443 |
| 2008/0136170 A1* | 6/2008 | Liepold | F16L 5/08 |
| | | | 285/45 |
| 2009/0012456 A1* | 1/2009 | Childers | A61M 1/288 |
| | | | 604/29 |
| 2010/0037968 A1* | 2/2010 | Bisutti | F16K 3/085 |
| | | | 137/637.05 |
| 2015/0094674 A1* | 4/2015 | Pratt | A61F 13/00068 |
| | | | 604/318 |
| 2015/0266600 A1* | 9/2015 | Haimi | B65B 7/2842 |
| | | | 53/408 |

* cited by examiner

FLUID TRANSFER COUPLING

BACKGROUND OF THE INVENTION

This invention relates generally to fluid transfer couplings, and more specifically to fluid transfer couplings for use in environments where the coupling may be exposed to potential contamination of the fluid from the environment.

Connectable fluid transfer couplings such as quick connect/disconnect couplings are used for a variety of applications such as vehicle refueling or storage tank filling and emptying. For many applications, contamination of the fluid being transferred by materials in the surrounding environment is not a significant concern. In such instances, various types of poppet valves and chucks or other connectors are commonly used, with the principal requirements being ease and reliability of the connection and avoiding leaks of the fluid being transferred into the surrounding environment.

In some situations, however, contamination of the fluid from contaminants in the surrounding environment can be a significant concern. In some cases, for example, the surrounding environment may contain harsh contaminants such as acids, caustic liquids, organic solvents, or seawater. In some cases, even in the seemingly benign environment of ambient air, contamination of the fluid can be a concern if the fluid is used in a process that is sensitive to oxygen, for example. One example where fluid being transferred through a coupling is at risk of environmental contamination is the underwater transfer of fluids such as cryogenic fluids (e.g., cryogenic oxygen and hydrogen used as oxidant and fuel in a fuel cell) to and from underwater vehicles or stationary powered systems. Ice crystals can form in such environments, and either dissolved materials in the surrounding water or the water itself can undermine performance of sensitive components such as fuel cells.

In cases where contamination of fluid being transferred through a coupling is a concern, low volume couplings such as so-called 'zero-volume' quick connect/disconnects have been proposed. Such couplings typically utilize mating surfaces on connectable coupling members that provide a close surface-to-surface coupling that leaves little void space between the coupling members in which contaminants from the surrounding environment can congregate. However, despite the moniker of 'zero-volume', such couplings still leave a small volume in which environmental contaminants can congregate. Some low volume quick connects utilize plungers or similar mechanical components to try and remove any residual contamination. However, even such measures cannot completely remove contaminants from the coupling area, as phenomena such as surface active effects can allow contaminants to cling to the mating surfaces.

In view of the above and other considerations, there remains a need to develop alternative couplings for fluid transfer.

BRIEF DESCRIPTION OF THE INVENTION

According to some aspects of the invention, a fluid transfer coupling includes first and second connectable coupling members that together contain a sealed interior space when connected. A gas or steam purge inlet and a purge outlet are disposed in fluid communication with the sealed interior space for purging potential contaminants out of the interior space. The coupling also includes a vacuum port in fluid communication with the sealed interior space for drawing a vacuum on the sealed interior space. The first coupling member includes a first fluid transfer conduit and the second coupling member includes a second fluid transfer conduit. The first and second fluid transfer conduits are positioned such that they can be connected together within the sealed interior space when the first and second coupling members are connected.

In some aspects, the coupling includes a gas purge inlet in fluid communication with the sealed interior space.

In some aspects, the coupling includes a steam purge inlet in fluid communication with the sealed interior space.

In some aspects, the coupling includes gas and steam purge inlets in fluid communication with the sealed interior space.

In some aspects, each of the first and second coupling members include separate fluid flow transfer conduits for oxygen and hydrogen, which can be coupled together to form separate oxygen and hydrogen fluid flow transfer conduits when the first and second coupling members are connected. In some aspects each of the first and second coupling members include separate fluid flow transfer conduits for liquid oxygen, gaseous oxygen, liquid hydrogen, and gaseous hydrogen, which can be coupled together to form separate liquid oxygen, gaseous oxygen, liquid hydrogen, and gaseous hydrogen fluid flow transfer conduits when the first and second coupling members are connected. In some aspects, the coupling includes a gas barrier between the oxygen and hydrogen fluid flow transfer conduits within the sealed interior space. This separation can help prevent any unintentional mixing of reactive hydrogen and oxygen within the sealed interior space.

In some aspects, the coupling includes a purge shroud. When deployed, the purge shroud forms a purge space around the fluid transfer conduits. This purge space is in fluid communication with the purge inlet and the purge outlet and can provide an otherwise sealed area for purging in the interior space of the coupled first and second coupling members.

In some aspects, the coupling includes a vacuum shroud. When deployed, the vacuum shroud forms a vacuum space around the fluid transfer conduits. This vacuum space is in fluid communication with the vacuum port, and can provide an otherwise sealed area for drawing a vacuum in the interior space of the coupled first and second coupling members.

In some aspects, the coupling is utilized in a system comprising a polymer electrolyte membrane (PEM) fuel cell, cryogenic oxygen and hydrogen storage tanks, and the fluid transfer coupling is in fluid communication with the cryogenic oxygen and hydrogen storage tanks.

In some aspects, a method of transferring fluid through a connectable coupling comprises connecting a first coupling member comprising a first fluid transfer conduit to a second coupling member comprising a second fluid transfer conduit. The connected coupling members together form an interior space inside the connected coupling members with the first and second fluid transfer conduits disposed in the interior space. A sealed purge space is formed in the inner space around the fluid transfer conduits, and the purge space is purged with steam or gas. A sealed vacuum space is formed in the inner space around the fluid transfer conduits, and a vacuum is drawn on the sealed vacuum space. After purging and drawing a vacuum, the first and second fluid transfer conduits are connected within the sealed vacuum space and the fluid to be transferred is flowed through the connected fluid transfer conduits.

In some aspects, the coupling is used, and the method is performed, underwater.

In some aspects, the purging is performed with steam, and a sealed interior space is cooled after purging to create a partial vacuum In some aspects, the coupling comprises separate oxygen and hydrogen fluid transfer conduits having a gas barrier between that forms separate spaces around the oxygen fluid transfer conduits and the hydrogen fluid transfer conduits within the sealed vacuum space. In such aspects, a vacuum can be separately pulled from the space around the oxygen fluid transfer conduits and from the space around the hydrogen fluid transfer conduits.

In some aspects, the pressure (or vacuum) of the vacuum space(s) can be monitored after the vacuum is drawn. If the vacuum does not meet performance specifications, any or all of the previous steps can be repeated to recover from a poor seal. In some aspects, the purge is repeated. In aspects where separate hydrogen and oxygen spaces are formed within the sealed vacuum space, the vacuum on these spaces can be monitored separately, which can help identify the location of any problems in the ability to maintain the desired vacuum.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

DETAILED DESCRIPTION OF THE INVENTION

Figure 1A:
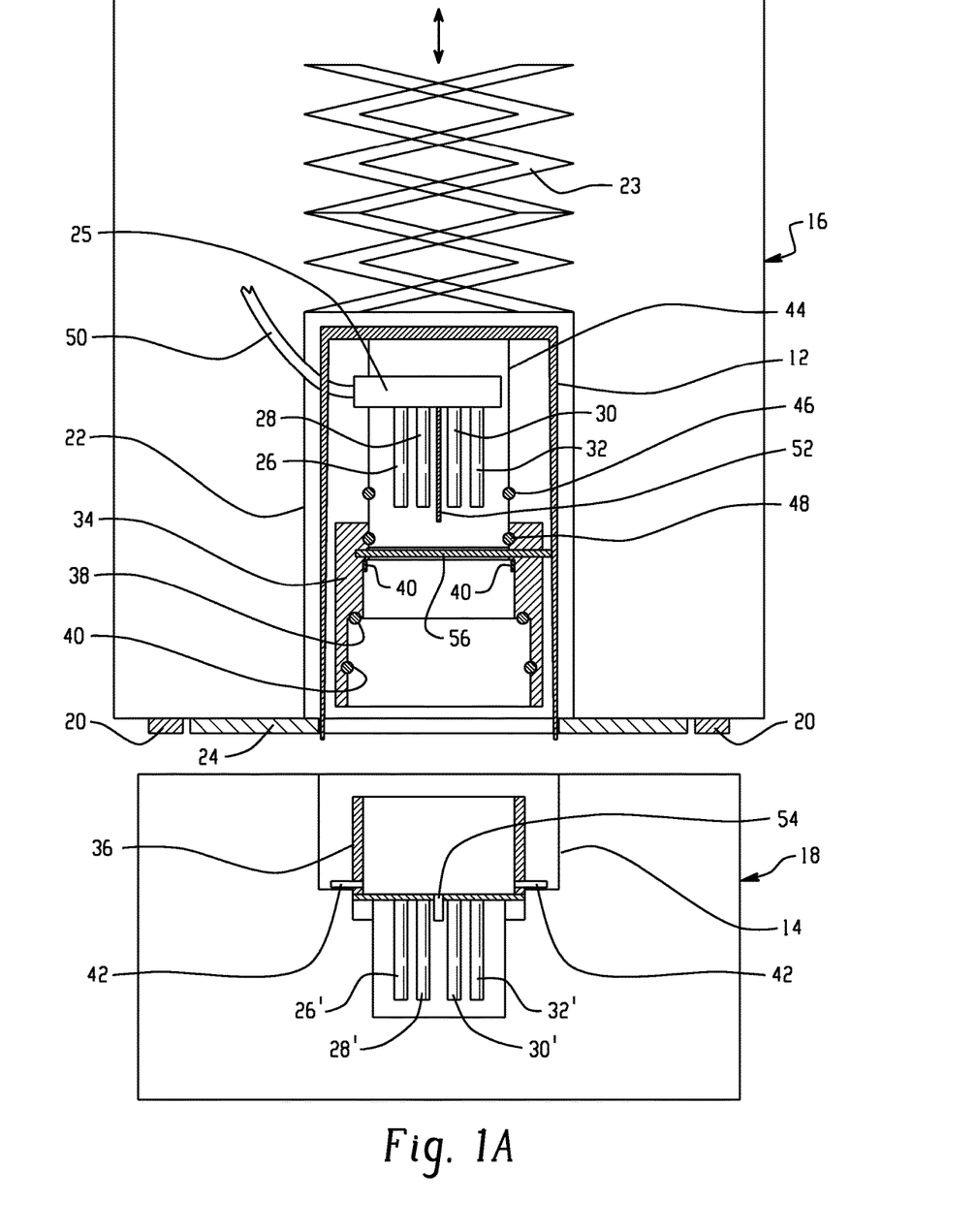
FIG. 1A is a schematic depiction of an exemplary coupling as described herein in its unconnected state.
Figure 1B:
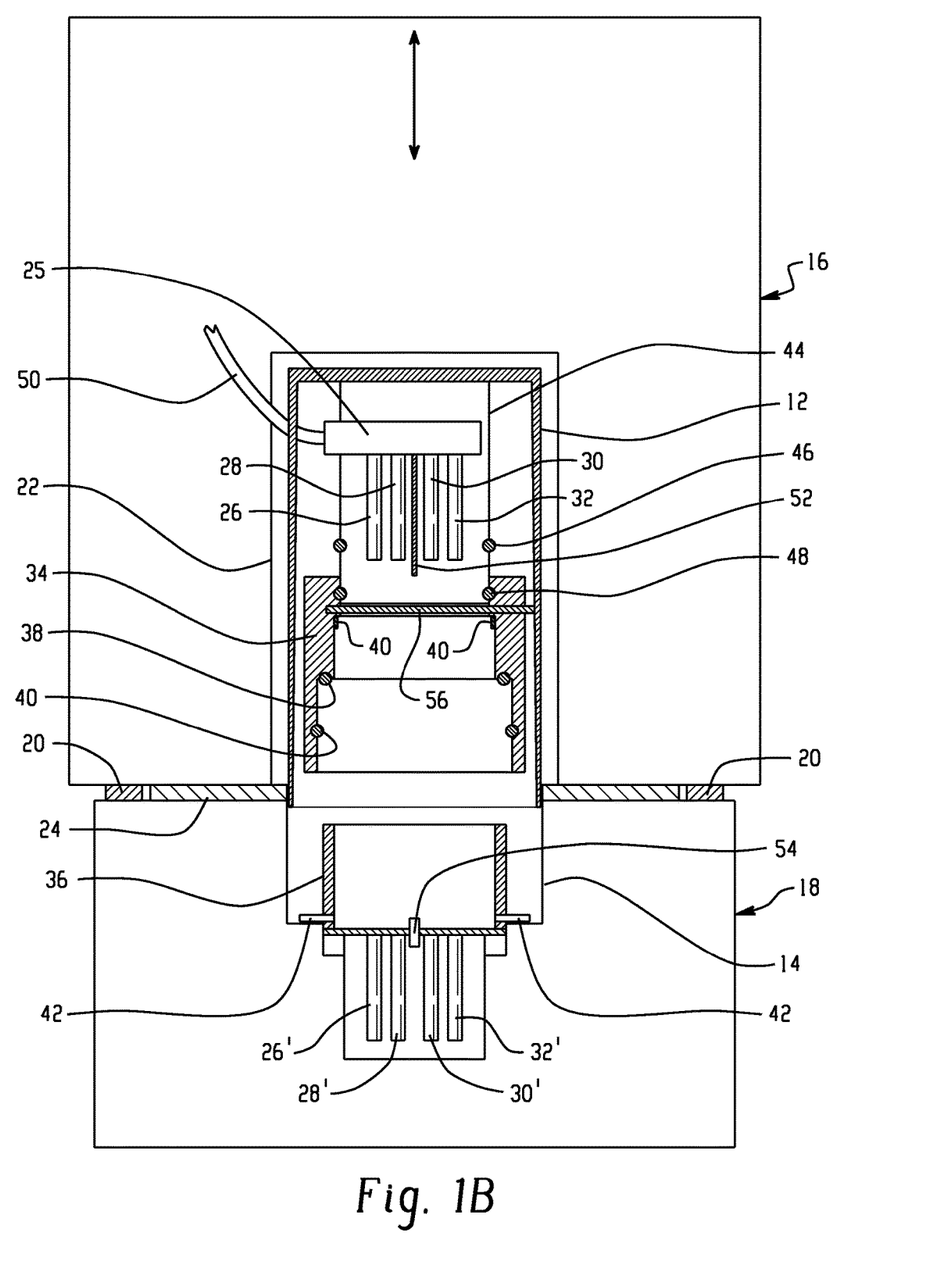
FIG. 1B is a schematic depiction of an exemplary coupling as described herein with coupling members connected.

Referring now to the Figures, FIGS. 1A-1F depict an exemplary coupling 10 in various stages of connection. In FIG. 1A, coupling members 12 and 14 are shown as components on larger structures 16 and 18 such as housings, vehicles, or modules between which fluid is to be transferred. Typically, at least one of the structures 16 or 18 would be a mobile structure such as a vehicle. Alignment bumpers 20 and alignment chuck 22 provide a visual and/or tactile cue for proper alignment of the coupling members 12, 14 as they are connected. A retracting cover plate 24 on structure 16 is shown in its retracted position. In FIG. 1B, the coupling members 12 and 14 are shown in their connected position.

Coupling member 12 has an articulating arm 23 associated therewith for deployment of various components thereof as further described herein. The deployable components of coupling member 12 include a fluid transfer conduit module comprising a vacuum-jacketed fluid manifold 25, liquid oxygen conduit 26, gaseous oxygen conduit 28, liquid hydrogen conduit 30, and gaseous hydrogen conduit 32. Corresponding fluid transfer conduits are disposed in coupling member 14: liquid oxygen conduit 26', gaseous oxygen conduit 28', liquid hydrogen conduit 30', and gaseous hydrogen conduit 32'.

Figure 1C:
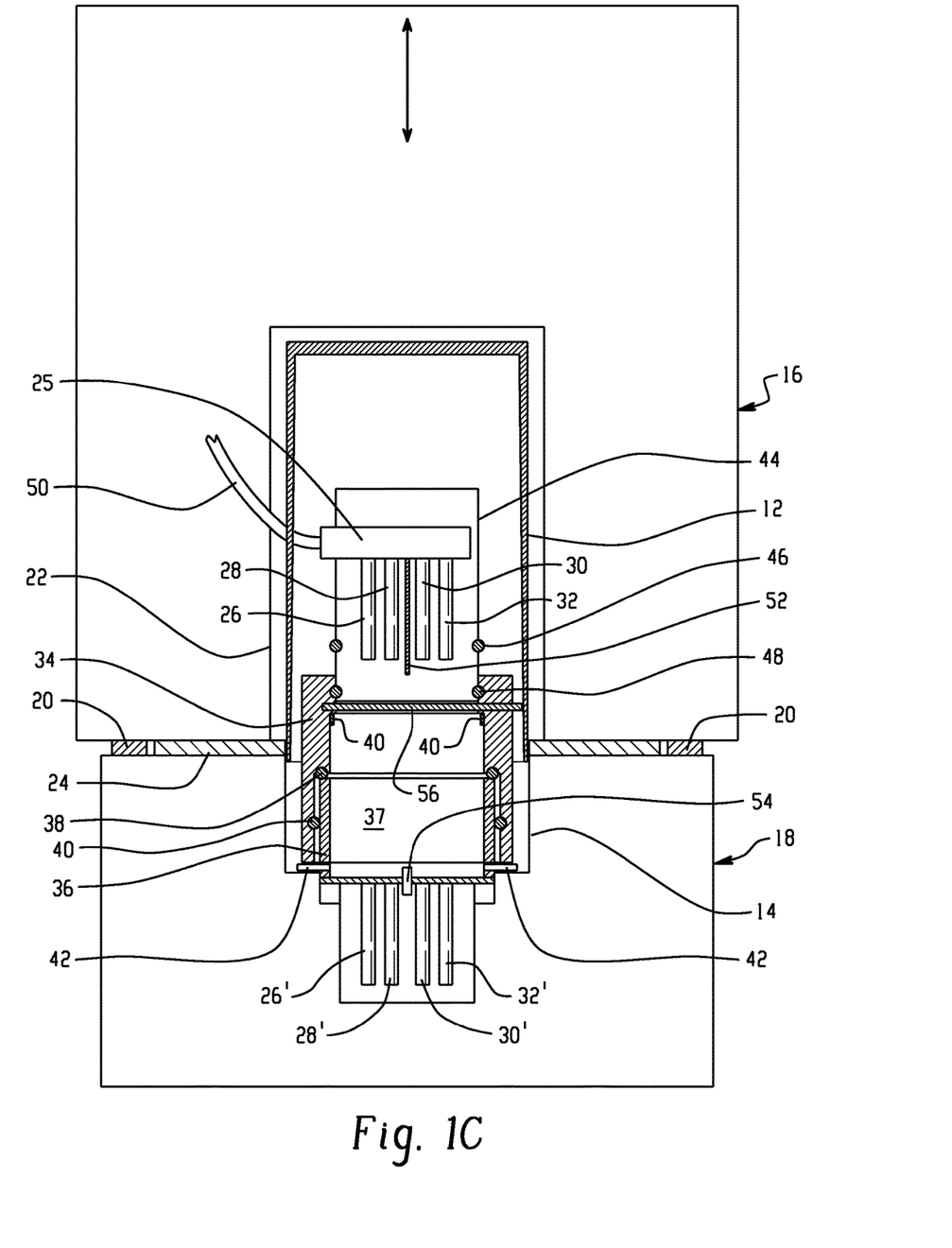
FIG. 1C is a schematic depiction of an exemplary coupling as described herein with coupling members connected and configured for purging.

Turning now to FIG. 1C, the fluid transfer conduit module has been deployed so that purge shroud 34 engages with purge shroud mating component 36. Purge seals 38, 40 form a seal between the purge shroud 34 and the purge shroud mating component 36 to enclose the sealed purge space 37. A steam or pressurized gas purge flow is introduced to the sealed purge space 37 through purge nozzles 40 and is discharged through purge drain ports 42, which can be equipped with one-way check valves to prevent contaminant inflow following purging. Pressurized gas such as nitrogen can be used for purging. Steam such as superheated steam can also be used for purging, and can provide benefits such as melting and removal of any ice particles or buildup from purge space 37. It can also provide a scrubbing action on surfaces in the sealed purge space 37, remove precipitates from seawater, and provide a partial vacuum formation during cooling. The pressure of the pressurized gas or steam purge can vary according to environmental parameters, such as the pressure of the environment in which coupling and fluid transfer is to take place. The purge pressure can range from 20 psia to 1000 psia, and more specifically from 300 psia to 700 psia. In some embodiments, the coupling 10 can be equipped with both steam purge and compressed gas purge. Such a configuration can be used, for example, for marine applications involving both underwater and topside fluid transfer connections (e.g., a fuel and oxygen delivery vehicle that takes on fuel and oxygen topside and delivers it to an underwater recipient) where compressed gas purge is used topside and steam purge is used underwater.

As shown herein, coupling member 12 can be described as an active coupling member whereas coupling member 14 without an articulating arm can be described as a passive coupling member. However, in other embodiments, depending on the particular design features, both of the coupling members can have actively deployable components. For example, the purge shroud 34 could have been deployed from the coupling member 14 (in this embodiment having its own coupling arm, not shown) instead of from the coupling member 12 as shown.

Figure 1D:
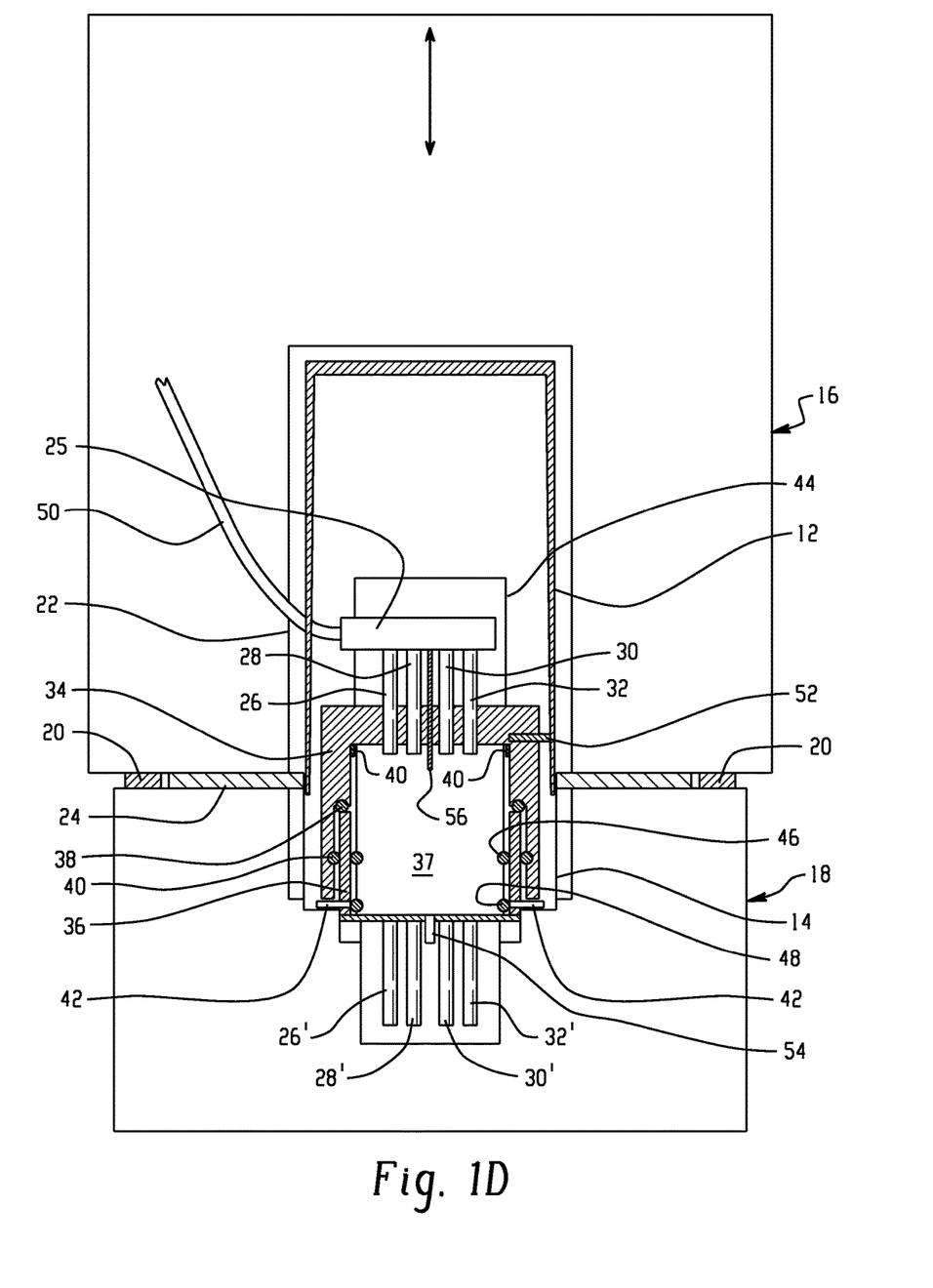
FIG. 1D is a schematic depiction of an exemplary coupling as described herein with coupling members connected and configured for drawing a vacuum.

Turning now to FIG. 1D, a further deployment imparted by the articulating arm 22 (FIG. 1A) of vacuum shroud 42 has been carried out. Vacuum seals 46, 48 form a seal to enclose a sealed vacuum space inside of vacuum shroud 42. A vacuum is drawn on the sealed vacuum space through vacuum jacket flex line 50, which has fluid transfer conduits disposed within the jacket. After a vacuum has been created in the sealed vacuum space, it can be tested for compliance with specifications. If a sufficient vacuum cannot be achieved or maintained, a process controller (or manual control) can re-initiate any of the previous steps, including docking of the larger structures (e.g., vehicles), connection of the coupling members, sealing of the purge space 37, purging, and sealing of the vacuum space, followed by re-establishing a vacuum and re-testing.

In some embodiments, and as shown in FIGS. 1A-1E, a gas barrier 52 is disposed between the oxygen-containing fluid transfer conduits 26, 28, and the hydrogen-containing fluid transfer conduits 30, 32. The gas barrier 52 seals against gas barrier mating member 54 to provide separate evacuation spaces around the oxygen-containing and hydrogen-containing fluid transfer conduits, which can help avoid any unintentional mixing of any escaped reactive gases as well as help identify any leak sources during vacuum testing.

Figure 1E:
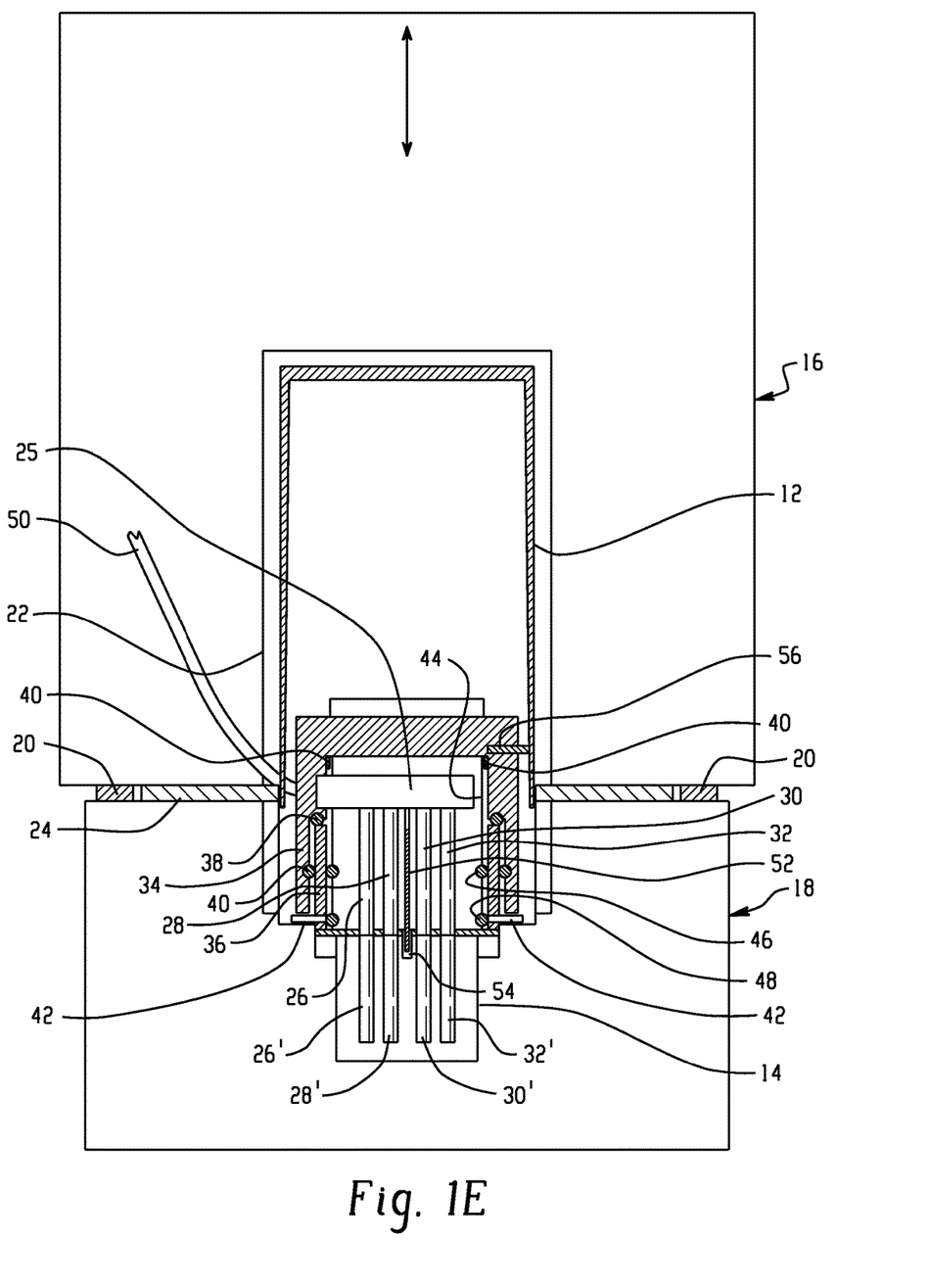
FIG. 1E is a schematic depiction of an exemplary coupling as described herein with coupling members connected and fluid transfer conduits connected.

After connecting, purging, and establishing a vacuum, the fluid transfer conduits are connected as shown in FIG. 1E, with the connection of liquid oxygen conduits 26 and 26', gaseous oxygen conduits 28 and 28', liquid hydrogen conduits 30 and 30', and gaseous hydrogen conduits 32 and 32'. The conduits can be fitted with self-connecting complementary connectors such as bayonet connectors fitted with poppet valves that are normally closed but are opened by act of connecting the conduits. After connection, fluid flow is initiated through the vacuum-surrounded fluid transfer conduits. The vacuum can be monitored throughout the fluid transfer to assure that there are no leaks.

Following completion of the fluid transfer, the coupling 10 can be disconnected by essentially reversing the steps described above. After fluid flow is terminated, the conduits 26, 28, 30, and 32 are disconnected and retracted from the corresponding conduits, 26', 28', 30', and 32', which causes closure of the poppet valves and sealing of the conduits. Vacuum can be maintained during this stage to protect until baffle 56 is in its resting position to ensure protection of the conduits. Vacuum can then be stopped and the vacuum shroud 44 retracted. Vacuum is then stopped, allowing the surrounding fluid environment (e.g., seawater, air) to flow back into the interior space of the coupling through pressure equalization ports (not shown), which can be equipped with filters. After the interior space has been filled and pressure equalized with the outside environment, the retractable cover 24 can be closed, and the coupling members 12 and 14 can be disconnected.

Figure 2:
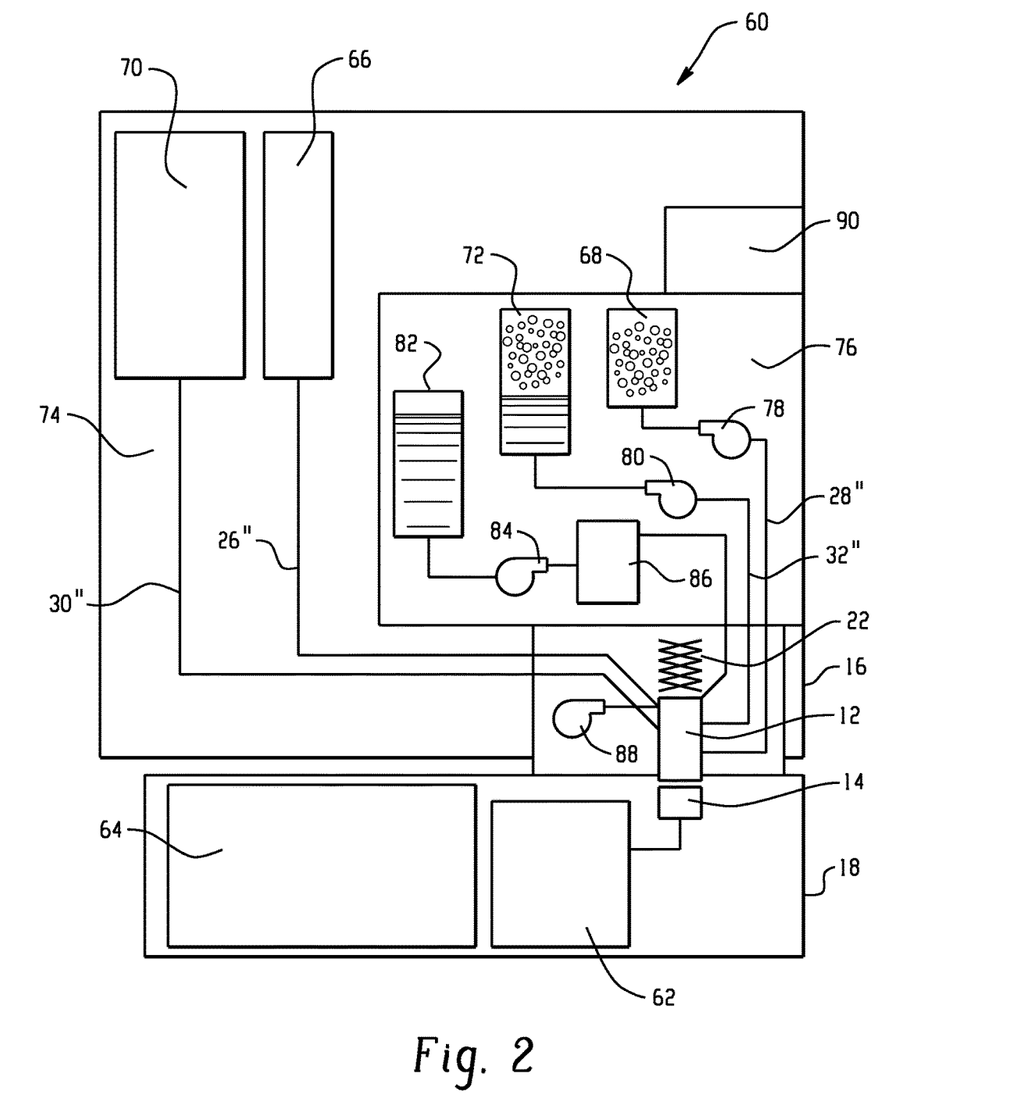
FIG. 2 is a schematic depiction of an exemplary fluid storage system with a coupling as described herein.

The coupling described herein can be used in connection with a wide variety of systems, indeed virtually any system, where a coupling is needed for fluid transfer. In an exemplary embodiment, depicted in schematic fashion in FIG. 2, the coupling is utilized in a system for the transfer of cryogenic oxygen and cryogenic hydrogen to a storage system such as for a PEM fuel cell on a vehicle or stationary structure such as an underwater vehicle or stationary structure. As shown in FIG. 2, the coupling members 12 and 14 and articulating arm 22 are disposed in oxygen/hydrogen transfer and storage system 60. In the exemplary embodiment depicted in FIG. 2, the structure 16 can be a submerged vehicle or station with an on-board PEM fuel cell stack (not shown) and associated oxygen and hydrogen storage system, and the structure 18 can be a refueling vehicle that replenishes the stored oxygen and hydrogen for the PEM fuel cell stack. In this system, oxygen and hydrogen are delivered from oxygen supply tank 62 and hydrogen supply tank 64 through the coupling members 14 and 12, into liquid oxygen conduit 26", gaseous oxygen conduit 28", liquid hydrogen conduit 30", and gaseous hydrogen conduit 32" to liquid oxygen storage tank 66, gaseous oxygen storage tank 68, liquid hydrogen storage tank 70, and gaseous hydrogen (and water vapor) storage tank 72. Liquid oxygen storage tank 66 and liquid hydrogen storage tank 70 are disposed in a cryogenic section 74 of the structure 16, and other components including the gaseous oxygen storage tank 68 and gaseous hydrogen (and water vapor) storage tank 72 are disposed in a non-cryogenic portion 76 of the structure 16. Oxygen pump 78 and hydrogen pump 80 assist in transfer of the gaseous portions given off by the liquid oxygen and hydrogen, into the storage tanks 68 and 72. For purging a sealed interior space in the coupling, pure water from purge storage tank 82 is pumped by pump 84 into steam generator 86, from where it is directed to the coupling member 12. A vacuum pump 88 (e.g., a roughing pump plus an ion or electrostatic pump) is utilized to draw a vacuum on the sealed interior space that contains pure water for steam purge. A control system such as an ECU (electronic control unit) 90 is disposed in the non-cryogenic portion 76 for process control and power management. Power can be supplied from an on-board PEM fuel cell stack (not shown) or other sources.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluid transfer coupling system, comprising
first and second connectable coupling members that when connected to each other define a sealed interior space;
a gas or steam source in fluid communication with a gas or steam purge inlet in fluid communication with the sealed interior space;
a purge outlet in fluid communication with the sealed interior space;
a vacuum pump in fluid communication with a vacuum port in fluid communication with the sealed interior space;
the first coupling member including first fluid transfer conduits comprising a first oxygen transfer conduit and a first hydrogen transfer conduit, and the second coupling member including second fluid transfer conduits comprising a second oxygen transfer conduit and a second hydrogen transfer conduit, said first and second oxygen transfer conduits connectable to each other and said first and second hydrogen transfer conduits connectable to each other, said fluid transfer coupling system configured for two-way transposition between first and second configurations, in which first configuration the first and second coupling members are disconnected and the first and second fluid transfer conduits are disconnected, and in which second configuration the first and second coupling members are connected and the first and second oxygen transfer conduits and first and second hydrogen conduits are directly connected to form connected conduits within the sealed interior space; and
cryogenic oxygen and hydrogen tanks in fluid communication with the oxygen and hydrogen transfer conduits.

2. The fluid transfer coupling system of claim 1, comprising a gas inlet in fluid communication with the sealed interior space.

3. The fluid transfer coupling system of claim 1, comprising a steam inlet in fluid communication with the sealed interior space.

4. The fluid transfer coupling system of claim 1, comprising a gas and steam inlet in fluid communication with the sealed interior space.

5. The fluid transfer coupling system of claim 1, further comprising a gas barrier between the oxygen and hydrogen fluid flow transfer conduits within the sealed interior space.

6. The fluid transfer coupling system of claim 1, further comprising a purge shroud that forms a purge space around the fluid transfer conduits, said purge space being in fluid communication with the purge inlet and the purge outlet.

7. The fluid transfer coupling system of claim 1, further comprising a vacuum shroud that forms a vacuum space around the fluid transfer conduits, said vacuum space being in fluid communication with the vacuum port.

8. The fluid transfer coupling system of claim 1, further comprising a purge shroud that forms a purge space around the fluid transfer conduits and a vacuum shroud that forms a vacuum space around the fluid transfer conduits, said purge space being in fluid communication with the purge inlet and the purge outlet, and said vacuum space being in fluid communication with the vacuum port.

9. A method of transferring oxygen or hydrogen through the connectable coupling system of claim 1, comprising
connecting the first coupling member to the second coupling member to form the interior space inside the connected coupling members with the first and second oxygen transfer conduits and the first and second hydrogen transfer conduits disposed in the interior space;
forming a sealed purge space in the interior space around the fluid transfer conduits;
purging the sealed purge space with steam or gas;
forming a sealed vacuum space in the interior space around the fluid transfer conduits;
drawing a vacuum on the sealed vacuum space;
testing the vacuum for leaks and repeating the process to assure adequate sealing; and
directly connecting the first and second oxygen transfer conduits and directly connecting the first and second hydrogen conduits within the sealed vacuum space and flowing the fluid to be transferred through the connected fluid transfer conduits.

10. The method of claim 9, performed underwater.

11. The method of claim 9, wherein the purging is performed with steam, and the method further comprises cooling the interior space after purging to create a partial vacuum.

12. The method of claim 9, wherein the coupling comprises separate oxygen and hydrogen fluid transfer conduits having a gas barrier between the separate oxygen and hydrogen fluid transfer conduits that forms separate spaces around the oxygen fluid transfer conduits and the hydrogen fluid transfer conduits within the sealed vacuum space.

13. The method of claim 9, further comprising monitoring the vacuum drawn on the sealed vacuum space.

* * * * *